United States Patent [19]

Ando et al.

[11] 4,082,718

[45] Apr. 4, 1978

[54] TAP HOLE MIX

[75] Inventors: Teiichi Ando; Hidenobu Itoi, both of Himeji, Japan

[73] Assignee: Nippon Steel Corporation, Tokyo, Japan

[21] Appl. No.: 688,999

[22] Filed: May 24, 1976

[30] Foreign Application Priority Data

May 30, 1975 Japan .................................. 50-64911
May 30, 1975 Japan .................................. 50-64912

[51] Int. Cl.$^2$ ................................................ C08K 5/05
[52] U.S. Cl. ............................. 260/33.4 R; 260/28 P; 260/28 R; 260/29.2 EP; 260/29.2 R; 260/29.3; 260/33.4 EP
[58] Field of Search ............ 260/28 P, 28 R, 29.2 EP, 260/29.3, 33.4 R, 33.4 EP, 29.2 R

[56] References Cited

U.S. PATENT DOCUMENTS

| 3,607,809 | 9/1971 | Elby ..................................... 260/28 |
| 3,678,130 | 7/1972 | Klapprott et al. ..................... 260/28 |

*Primary Examiner*—Melvyn I. Marquis
*Attorney, Agent, or Firm*—Toren, McGeady and Stanger

[57] ABSTRACT

A tap hole mix for a blast furnace and the like containing essentially no binder comprising either water or one or more of tar, pitch and asphalt with or without the addition of a resin, which comprises refractory materials composed of grains of one or more of clay, chamotte, alumina, silicon carbide and the like and a carbonaceous material, a hardener comprising a novolak-type phenol resin to which a substance which produces formaldehyde by the thermal decomposition or a thermosetting resin is added in a definite proportion, and an alcoholic solvent. The present inventive tap hole mix is rapidly hardened or set, has excellent corrosion resistance and does not cause the occurence of unpleasant smoke and abnormal dusts.

7 Claims, No Drawings

TAP HOLE MIX

BACKGROUND OF THE INVENTION

The present invention relates to a tap hole mix containing essentially no binder, e.g., either water or tar (including pitch and asphalt) with or without the addition of a resin.

For blocking a tap hole of a blast furnace and the like, such mixes as a mix containing water and a mix using a binder comprising one or more of tar, pitch and asphalt with or without the addition of a resin have hitherto been used.

On the other hand, as a result of the development of a high burden operation under high pressure and high productivity in the blast furnace, a tap hole mix having following characteristics is now required.
 a. a suitable plasticity necessary for plugging the tap hole with the use of a plugging gun,
 b. a rapidly hardening or setting property which exhibits sufficient strength after plugging the tap hole,
 c. excellent strength at higher temperatures and an excellent corrosion resistance against blast furnace molten pig iron and slag,
 d. provide for easy-opening of the tap hole, and
 e. avoid the emission of black smoke and abnormal dusts.

However, the conventional tap hole mixes hitherto used, such as, a mix containing water and a mix using an organic binder, do not satisfy said requisites simultaneously.

In applying a tap hole mix to a blast furnace, a mix is plugged into a tap hole through a plugging gun by attaching the gun close to the tap hole when one tapping is over, the plugging gun is held in this position until the mix exhibits a sufficient strength in the tap hole and is not pushed back against the furnace pressure or until the mix shows a sufficient strength to stop the flowing out of the melt in the furnace to the outside of the furnace. Then, the plugging gun is returned to the former position to finish the plugging of the tap hole. During a given period after plugging, molten pig iron and slag approach a definite level in the furnace, and then the tap hole is opened by an opener to tap the molten pig iron and slag out of the furnace. For example, in a blast furnace with a capacity of 2000 to 5000 tons per day, the tapping usually needs about 60 to 180 minutes, and the amount of pig iron per tapping is about 200 to 600 tons. The tapping is done 10 to 15 times a day.

The tap hole mixes hitherto used are chiefly of bonded tar type using tar (including pitch and asphalt) as a binder. Such mixes have no particular problems with respect to the plasticity in filling the mix in the tap hole, but have various problems in other respects. Since tar is thermoplastic, the mix is not rapidly hardened by the furnace heat after the mix is filled in the tap hole and does not bind completely to strengthen the mix sufficiently against the furnace pressure until the carbon-carbon bonds are formed by the carbonization of tar. Thus, the plugging gun must be held close to the tap hole continuously until the carbon-carbon bonds are sufficiently formed. For example, it requires more than 40 minutes until the bending strength of the mix becomes more than 10 kg/cm² at 600° C. During this time, the plugging gun is held close to the tap hole and the tapping operation from the tap hole is impossible, so that, in a blast furnace having only one tap hole and even in a furnace having several tap holes, the operation efficiency is lowered and accordingly the productivity of the furnace is also remarkably lowered.

Since tar is thermoplastic, the polymerisation of the binder proceeds with difficulty because of the furnace heat and the binder is carbonized in this condition as the carbon bonding does not occur. The formation of three dimensional carbon-carbon bonds does hardly take place and the bonding strength is very low. For example, the hot bending strength of the mix is only about 15 kg/cm² at 1400° C.

Further, the volatile matter in the binder has an influence on the porosity of the mix. When the binder contains a large amount of volatile matter, the mix becomes porous and is corroded seriously as the pig iron and slag pass through the tap hole. When the tap hole is opened before the volatile matter is completely removed from the furnace, or in other words, when the tap hole is opened by an opener before the carbon-carbon bonds of the binder have completely formed, the strength of unbaked portion of the tap hole mix is poor and the unbaked portion of the tar is exposed to sudden higher temperatures because of contact with molten pig iron and slag, so that black smoke and abnormal dusts are caused to occur, thus deteriorating the working environment. The abnormal dusts formation increases the corrosion and causes a rapid enlargement of the tap hole diameter, requiring operating the blast furnace at lowered furnace pressure and decreasing the amount blowing in, fluctuating the furnace conditions and reducing the productivity.

Since a tar bonded tap hole mix is also low in abrasion resistance against molten pig iron and slag as well as in its corrosion resistance, the dissolution loss of a tap hole plugged with the tar bonded mix is very large, and the tapping time per tapping must be shortened. In order to secure the desired goal of the total amount tapped per day, about 16 tappings are necessary per day, thus increasing the labour burden of the furnace operators.

A tap hole mix using a binder comprising tar (including pitch and asphalt) and a thermosetting resin has been developed in recent years. However, such a mix needs 30 minutes to exhibit a bending strength of more than 10 kg/cm² at 600° C, which is a goal of the mix having rapidly hardening property, and its hot bending strength is about 15 kg/cm² at 1400° C, so that said mix has various problems in applying particularly to a blast furnace in a high pressure operation. Its corrosion resistance is also about the same as a tar bonded mix. The tap hole suffers from an abnormal dissolution loss in applying said mix to a large size blast furnace with a tapping amount of more than 500 tons per one tapping, so that the tapping time must unavoidably be shortened, and consequently, the frequency of tapping per day increases and the labour burden increases. The furnace condition also deteriorates, and tuyere damage takes place.

It is considered that the troubles in mixes containing a binder which are obtained by adding a thermosetting resin to tar are due to the poor mutual solubility between the tar, pitch and asphalt and the thermosetting resin, and the condensation polymerisation reaction does not proceed smoothly under the coexistance of the two components.

As a result of detailed studies on the tap hole mix and considering the difficulties with the water containing mix, the tar bonded mix and the mix containing a binder obtained adding thermosetting resin to tar, the present inventors have succeeded in developing a tap hole mix having characteristics particularly suitable for a large size blast furnace and a blast furnace with a higher top pressure operation.

DESCRIPTION OF THE INVENTION

An object of the present invention is to offer a tap hole mix which is able to rapidly exhibit a sufficient strength.

Another object of the present invention is to provide a tap hole mix with excellent corrosion resistance at higher temperatures.

A further object of the present invention is to eliminate the various problems in applying a tap hole mix, such as, an offensive smell which increases when a tap hole mix is baked by the furnace heat and can not be tolerated by the furnace operators.

A still further object of the present invention is to avoid the use of a binder comprising tar, pitch and asphalt with or without the addition of a thermosetting resin to attain said objects.

The details of the invention will be described in the following.

Phenol resins have been used as industrial materials, such as, electrical and mechanical parts. There are two kinds of phenol resin in general, i.e., novolak-type phenol resin and resol-type phenol resin. The former is thermoplastic and has a mean molecular weight of 200 to 1000, and the latter is thermosetting. It is usual to add about 10% of hexamethylenetetramine as a hardener in using a novolak-type phenol resin for these purposes and the resol resin is used as a solution in water or in other solvents.

In considering that phenol resin gives a high carbonization yield at higher temperatures and exhibits high strength quickly, the present inventors carried out various experiments on the application of phenol resins as an additive of a tap hole mix for a blast furnace. However, it was proved that, in applying novolak-type phenol resin as well as resol-type phenol resin, in the form they are used for electrical and mechanical parts as an additive to refractory materials to obtain a tap hole mix, the mix, filled in a plugging gun, is hardened by the radiation heat of the tapping spout and binds with the tap hole when the plugging operation is carried out thus causing various problems with the plugging gun. Therefore, such a resin can not be used. Particularly, it was found difficult to store resol-type phenol resin for a long while due to polymerization and increasing viscosity during storage, and in kneading the refractory materials with the addition of such an aged resin, the wetting effect of the resin is inferior, the kneading is difficult and a large amount of the resin is needed to ensure a sufficient plasticity. These various troubles arise because phenol resin lacks the thermal stability at lower temperatures (30° to 150° C).

As mentioned above, the use of resol-type phenol resin alone in a tap hole mix is disadvantageous because of storage, etc. Novolak-type phenol resin, containing about 10% of hexamethylene-tetramine as usual, has a low thermal stability, and its decomposition temperature is lowered by the absorption of water vapour thus deteriorating the thermal stability still more. Therefore, phenol resins conventionally used for electrical and mechanical parts as they stand can not satisfactorily be used for the present inventive purpose.

For the purpose of making the best use of the characteristics of phenol resin, the present inventors investigated the stabilization of phenol resin at lower temperatures so that they meet the various requisites of an additive of a tap hole mix. The present inventors succeeded in using a novolak-type phenol resin, which has excellent storage properties at ambient temperatures, in developing a tap hole mix having various excellent characteristics by adding a small amount of a hardener thereto.

The corrosion resistance of a tap hole mix is determined basically by the kind of refractory materials. The refractory materials of the present invention comprise grains of one or more of clay, chamotte, alumina, silicon carbide and the like and a carbonaceous substance. Examples of the composition of the refractory materials are: 15 to 25% of clay, 25 to 35% of chamotte, 15 to 30% of silicon carbide and 15 to 25% of coke (or graphite); 25 to 35% of alumina, 15 to 25% of clay, 15 to 30% of silicon carbide and 15 to 25% of coke; and 40 to 60% of pyrophillite, 15 to 30% of silicon carbide and 15 to 25% of coke. These refractory materials are desirously composed of coarse grains with a diameter of 5 to 3 mm, 20 to 30% of medium grains with a diameter of 3 to 1 mm and 30 to 50% of fine grains with a diameter less than 1 mm.

The first characteristic of the present invention is to add an appropriate amount of novolak-type phenol resin together with, as a hardener thereof, a small amount of a substance with an alcoholic solvent which produces formaldehyde by the thermal decomposition promoted by the furnace heat to said refractory materials.

The novolak-type phenol resin used in the present invention possesses a mean molecular weight of 200 to 800 and is liquid or powdery. Those having a mean molecular weight of more than 800 are highly polymerized, have a very high melting point and a high viscosity, so that a phenol resin is difficult to distribute in the refractory materials unless the kneading is done above 100° C. Moreover, their solubility is poor in a solvent as will be mentioned hereinafter, and a large amount of solvent is needed in order to give the mix sufficient plasticity, so that the structure of the mix becomes porous after the mix is filled in the tap hole, and molten pig iron and slag enter into the mix. Further, since such a phenol resin is highly polymerized, three dimensional carbon-carbon bonds are difficultly formed in the temperature range of 150° to 600° C, and consequently a long time is required until the mix is sufficiently hardened, thus lowering the efficiency of the tapping operation and causing the occurrence of abnormal dust when the tap hole is opened and the mix is insufficiently baked.

The amount of novolak-type phenol resin added to the mix is 3 to 30%. When the amount of resin is less than 3%, satisfactory plasticity cannot be obtained to fill the mix in the tap hole. The mix is dry, and not only is the plugging of the tap hole difficult, but also, it requires a long while until the mix exhibits sufficient strength, so that the operation efficiency and the productivity are lowered. When the tap hole is opened shortly after the tap hole is plugged, the mix is not yet sufficiently hardened, so that the diameter of the tap hole is remarkably enlarged by the corrosion due to the molten pig iron and slag, causing molten pig iron and slag to run over the tapping spout. In order to secure the desired goal of the total tapping amount of pig iron per day, the tapping must be done frequently, and it becomes difficult to discharge the melt in the furnace completely from of the furnace. Thus the furnace condition is disturbed and other problems occur.

When the tap hole mix contains more than 30% of the resin, the mix becomes adhesive and sticky and adheres to the interior of the kneader as well as the roller and scrapper thereof, so that the kneading operation becomes difficult. A large amount of the mix adheres to the interior of the plugging gun, and interferes with the plugging operation. After the mix is filled in the tap hole, since the amount of the resin is too high, thus a long period is required for the resin to sufficiently harden, lowering the operation efficiency and the productivity. If, after the mix is plugged up, the baking period is too short and the tap hole is then opened, insufficient baking of the mix takes place. The unbaked portion of the resin is then suddenly exposed to higher temperatures which results in abnormal amounts of dust being formed. This, in turn, presents environmental pollution problems. Since the amount of the resin is too high, a large amount of decomposed gas evolves from the resin. Accordingly, when the tap hole is opened before the gas is exhausted completely out of the furnace, the refractory materials are not sufficiently bonded by the carbon-carbon bonds from the resin, and consequently the corrosion resistance of the mix is inferior. For the same reason, the layer of carbon-carbon bonds around the refractory grains becomes thick, so that the bonding strength of the tap hole mix is lowered and the corrosion resistance is also reduced. Finally, since the resin is expensive, tap hole mix also becomes expensive.

When the amount of resin in the tap hole mix is in the range of 3 to 30%, the mix shows a suitable lubricity for the kneading and scarcely adheres to the kneading vessel, roller and scrapper. This is because the amount of resin is relatively small and the mix has, as a whole, a small adhesiveness. The plasticity of the mix is fitted for the extrusion force of the plugging gun and the plugging is accomplished smoothly. As for the properties of the mix after filling up in the tap hole, since the refractory materials are wetted sufficiently with the resin, the mix hardens easily and increases to sufficient strength rapidly. The amount of residual carbon is large and the carbon-carbon bonds thereof strengthen the bonding of the refractory grains, so that the mix shows excellent corrosion resistance. Contrary to the case of a tar bonded mix, there is no occurrence of black smoke and abnormal dusts in plugging and opening the tap hole, so that this mix is beneficial also from the point of environment sanitation.

In the present invention, a substance to produce formaldehyde by the thermal decomposition due to the furnace heat is added to the tap hole mix as a hardener (hardening accelerator) of novolak-type phenol resin to accelerate the hardening of the mix and further to improve the corrosion resistance thereof. Formaldehyde produced by the thermal decomposition of said substance acts as a crosslinking agent for the resin and accelerates the three dimensional hardening and the strengthening of the mix, and the corrosion resistance of the mix is also improved thereby.

A substance to produce formaldehyde is mixed with the resin previously or is mixed in a kneader with the refractory materials and resin. The amount added is 0.5 to 10% of the resin. When the amount is less than 0.5%, no effect can be seen. Its crosslinking action is very small and rapid strengthening of the mix cannot be obtained after the mix is filled in the tap hole. When the amount is larger than 10%, the low temperature stability of the resin is very poor. After the mix is introduced in the plugging gun, the resin is easily hardened by the radiation heat of the tapping spout, and the mix hardens by baking in the tap hole in plugging the tap hole, so that problems occur with the plugging gun. Moreover, since free formaldehyde is evolved, an environmental problem occurs.

When the amount of substance to produce formaldehyde added is in the range of 0.5 to 10% of the resin, the mix does not harden in the plugging gun and does not become bonded by baking during plugging. The crosslinking and the strengthening effects are satisfactory, the carbonization yield at higher temperatures is sufficient, and the corrosion resistance of the mix is also excellent. The addition of 0.5 to 10% is also desirous from the economical point of view. The addition of 0.5 to 10% of a substance to produce formaldehyde makes the mix strengthen rapidly and the tapping interval can be shortened to one half of that required eith the conventional mix, thus improving the operation efficiency of the blast furnace and elevating the productivity. As the corrosion resistance also is excellent, the tapping stream is stabilized.

As a substance suitable for use to produce formaldehyde, any substance which will produce formaldehyde by the thermal decomposition from the furnace heat after the mix is filled up in the tap hole can be used. Practically, such substances as hexamethylenetetramine, acetal resin, paraformaldehyde and trioxane are used.

Hexamethylenetetramine, acetal resin and others decompose at a temperature higher than about 60° C to produce formaldehyde and are effective as a crosslinking agent for novolak-type phenol resin. Particularly, in kneading the mix under heat and in exposing the mix at higher temperatures in the plugging gun, they are hardly influenced by the heat and remain sufficiently stable to attain the desired object. These substances are effective to accelerate the three dimensional hardening of the mix by crosslinking the resin, to improve the rapid strengthening of the mix, to increase the carbonization yield of the resin, to strengthen the bonding of the refractory grains by the carbon-carbon bonds from the resin and to improve the corrosion resistance of the mix.

When the addition amount of hexamethylenetetramine, acetal resin and others is less than 0.5% of novolak-type phenol resin, the amount of the hardener is too small and the amount of formaldehyde produced therefrom is insufficient, so that the crosslinking effect is poor, the formation of three dimensional hardening is insufficient and the strengthening of the mix is not rapid. Since the carbonization yield is also low, the bonding strength of the refractory grains is low and the corrosion resistance is poor. Therefore, the operation efficiency and productivity are lowered. Since the corrosion resistance is not satisfactory, the tapping must be done frequently in order to attain the desired tapping amount goal per day, thus increasing the labour burden of the furnace operators. When the melt in the furnace is not discharged completely, the furnace condition fluctuates, making the furnace condition inferior.

In a tap hole mix containing more than 5% of hexamethylene-tetramine or more than 10% of acetal resin per novolak-type phenol resin, the amount of formaldehyde produced by the thermal decomposition is too great and the three dimensional hardening of the mix produced by crosslinking of the resin proceeds too fast, so that the mix is hardened in the plugging gun by the radiation heat of the tapping spout and is crosslinked by baking in the tap hole in plugging the tap hole. Thus the plugging gun is overburdened and the plugging becomes difficult. Moreover, the excess of formaldehyde evolves undesirously a free formaldehyde which has an unpleasant smell.

In a mix containing 0.5 to 5% of hexamethylenetetramine or 0.5 to 10% of acetal resin per novolak-type phenol resin, formaldehyde is produced by the thermal decomposition above 60° C and reacts properly with the resin, so that the mix is effectively and rapidly hardened, the carbonization yield of the resin is high, strong carbon-carbon bonds are formed and the corrosion resistance is also excellent.

The solvent used in the present invention is an alcoholic solvent, such as, methanol, ethanol, isopropyl alcohol, ethylene glycol, diethylene glycol, liquid polyethylene glycol, propylene glycol, glycerine, benzyl alcohol and other higher alcohols. The addition amount is suitably 4 to 15%. The object of the addition of solvent is chiefly to render the mix plastic and to wet the refractory grains with the phenol resin.

The solubility of novolak-type phenol resin used in the present invention is low in solvents other than alcoholic solvents. Although non-alcoholic solvents are effective to render the mix plastic, since their wetting effect on the refractory grains is very poor, the kneading efficiency becomes poor, the mix is strengthened only slowly, the carbonization yield of the resin is low and the corrosion resistance of the mix is not improved. On the contrary, in using an alcoholic solvent, the mutual solubility with phenol resin is good, so that the kneadability is superior and the mix exhibits a smooth increase in strength, thus giving an excellent result.

When the addition amount of alcoholic solvent is less than 4%, since the amount of solvent per unit resin is small, the binder becomes viscous, the wetting efficiency and the plasticity are low, and the mix has dry spots during kneading, the filling of the mix in the plugging gun is difficult and complete filling is impossible, resulting in breaking out of the melt and shallowing of the tap hole which is undesirable from the point of safety and corrosion resistance. When the addition amount of the solvent is more than 15%, the structure of the mix becomes porous after filling the mix in the tap hole due to the volatility of the solvent, large amounts of molten pig iron and slag enter the mix and the corrosion resistance is deteriorated. Further, since it takes a long while until the solvent evaporates sufficiently, the baking time is prolonged, and abnormal dust is caused to occur in opening the tap hole in a short baking period. For these reasons, the inventors have succeeded in obtaining a tap hole mix having suitable kneadability, proper plasticity to plug the tap hole with the use of a plugging gun and a rapid hardening property by defining the addition amount of the solvent to 4 to 15%.

It was proved that a tap hole mix obtained by kneading refractory materials with the addition of 3 to 30% of novolak-type phenol resin, 4 to 15% of alcoholic solvent and 0.5 to 10% based on the resin of a substance to produce formaldehyde by thermal decomposition under the furnace heat gave a satisfactory result in practical use. Troubles, such as, the decomposition in kneading and the hardening in the plugging gun, did not occur. It was sufficient to hold the plugging gun close to the tap hole for only 5 to 15 minutes, which is one fourth the time as compared with the conventional mixes. Thus, it was possible to increase the tapping amount per tapping by 20% and the corrosion resistance about 1.5 to 2 times. The tapping frequency per day could be reduced and the labour burden of the furnace operators is lightened. The fluctuation of the furnace condition could easily be handled and the furnace operation was quite stable.

Another characteristic of the present invention is to add an appropriate mixture of novolak-type phenol resin and a thermosetting resin together with an alcoholic solvent to said mix of refractory materials to obtain a superior tap hole mix.

Although a novolak-type phenol resin having a mean molecular weight of 200 to 800 (A) does not harden in itself, suitable carbonization yield can be obtained and the mix is strengthened rapidly by adding an appropriate amount of a thermosetting resin (B), and thus a tap hole mix having excellent high temperature strength and corrosion resistance can be obtained. By adding a suitable amount of alcoholic solvent thereto, the kneadability becomes suitable and appropriate plasticity can be produced in plugging.

According to the detailed experiments of the present inventors, it is proved that the proper mixing ratio of a novolak-type phenol resin (A) and a thermosetting resin (B) is $$(A) + (B) = 3 - 30\% \text{ and } \frac{(B)}{(A) + (B)} \times 100 = 3 - 25\%$$

and the amount of alcoholic solvent is suitably 4 to 15%.

When the amount of (A) + (B) is less than 3%, the resin in total is insufficient to cover the surface of refractory grains completely, so that the plasticity of the mix is insufficient in plugging the tap hole and the plugging becomes difficult. This drawback can be overcome with the addition of a large amount of solvent, but then the mix becomes porous, so that not only molten pig iron and slag enter therein but also it needs a long while until the baking of the mix is completed, and abnormal dusts are caused to occur in opening the tap hole under a short hour's baking. Since the amount of resin is relatively little, the amount of residual carbon is insufficient after the baking at higher temperatures, the strength of the mix is insufficient and its corrosion and abrasion resistances are inferior.

When the amount of (A) + (B) is larger than 30%, the resin is too much to perform the kneading smoothly. The mix is sticky and adheres to the roller, scrapper and others in the kneader. The mix exhibits strength only slowly in plugging the tap hole, and moreover, a large amount of gas evolves from the resin, making the structure of the mix porous. In opening the tap hole prior to the complete carbonization of the resin, the corrosion resistance of the mix is inferior and disagreeable abnormal dusts are caused to occur in some instances. The addition of such a large amount of resin is also disadvantage from the economical point of view.

The ratio of (A) and (B) plays also an important role, and it is effective to control the ratio of said two resins as $$\frac{(B)}{(A) + (B)} \times 100 = 3 - 25\%.$$

When this ratio is smaller than 3%, (B) is too little as compared with (A), so that the three dimensional carbon-carbon bonds are formed difficultly, and accordingly the carbonization yield at higher temperature is low, the mix exhibits strength only slowly, the strength is insufficient, and the corrosion and abrasion resistances are deteriorated. According to the experiments of the present inventors, when the amount of (B) is increased, the carbonization yield is increased and the corrosion and abrasion resistances are improved, but when the amount exceeds 25%, since (B) is apt to age, the storage of the mixed resin as well as the mix is difficult for a long while. During storage, (B) polymerizes to increase viscosity and is gelatinized partially, and thus the kneadability of the mix is injured remarkably. The tap hole mix obtained by the addition of more than 25% of (B) is hardened in the plugging gun by the radiation heat of the tapping spout and the plugging becomes impossible, or the mix is put together by baking in the tap hole during plugging. When $$\frac{(B)}{(A) + (B)} \times 100$$

exceeds 25%, the carbonization yield is increased but scarcely and the thermal stability of the resin is unadequately deteriorated. In the range $$\frac{(B)}{(A) + (B)} \times 100 = 3 - 25\%,$$

the carbonization yield of the resin is suitable and a tap hole mix having good kneadability and excellent corrosion and abrasion resistances can be obtained. The storage property of the mix is also satisfactory.

As a thermosetting resin used in the present invention, one or more of resol-type phenol resin, urea resin, aniline resin and epoxy resin are applicable. As for said resol-type phenol resin, the one with a mean molecular weight of 130 to 300 is suitable. The storage property is good and the kneadability is satisfactory from the points of its solubility and viscosity, and the thermal stability of the mix is also excellent in plugging.

As for alcoholic solvent, the one already described is used, so that the description thereabout will be abridged.

Examples of the first characteristic of the present invention will be described in the following. Practical tests were carried out with the examples of the present inventive tap hole mixes as shown in Table 1. The refractory materials used in the examples comprised clay, chamotte, silicon carbide and coke, and the solvent used was ethylene glycol.

In examples 1, 2 and 3, said refractory materials were kneaded with the addition of 15% of a lignin-modified phenol resin as a novolak-type phenol resin, 0.5 to 10% per said resin of paraformaldehyde as a substance to produce formaldehyde and 5% of the solvent. The hot bending strength of the tap hole mix at 600° and 1400° C were elevated as the amount of paraformaldehyde was increased. From the result of the practical tests, it was proved in every mixing ratio that the rapidly strengthened property and the corrosion resistance of the mix were excellent and a stable tapping stream could be obtained.

In examples 4 – 7, a novolak-type phenol resin and hexamethlenetetramine were used. In examples 4, 6 and 7, 15% of a novolak-type phenol resin was used and the amount of hexamethylenetetramine was respectively 0.5, 2.5 and 5%. In increasing the amount of hexamethylenetetramine, the hot bending strengths were increased both at 600° and 1400° C. It was sufficient to hold the plugging gun close to the tap hole only for 5 to 15 minutes, so that, as compared with the holding time of the gun as long as 40 to 60 minutes in the cases of conventional tap hole mixes, the operation efficiency and the productivity were largely improved. The tapping could satisfactorily be continued for 85 to 100 minutes as compared with the conventional tapping time of 60 to 80 minutes, the corrosion resistance was improved by 10 to 20%, and an excellent operation environment could be obtained with no occurrence of abnormal dusts and black smoke. In example 5, 30% of a novolak-type phenol resin and 0.5% per said resin of hexamethylenetetramine were added. The kneading was done at 70° C. The tapping could be continued smoothly for 85 minutes and it was sufficient to hold the plugging gun only for 15 minutes, and thus the operation efficiency was elevated and the corrosion resistance was improved by 10 to 20%.

In examples 8, 9 and 10, 15% of a novolak-type phenol resin was added together with 0.5 to 10% per said resin of an acetal resin as a substance to produce formaldehyde. Since acetal resin has a relatively high decomposition temperature as compared with other substances to produce formaldehyde, the holding time of the plugging gun must somewhat be prolonged, but no trouble was observed in the practical operation. The corrosion resistance was excellent and a stable tapping stream could be obtained.

The result of practical tests with the examples of another characteristic of the present invention together with the comparison examples thereof was as follows. As shown in Table 2, the refractory materials comprised a grain mixture of alumina, silicon carbide, clay, coke, and some instances chamotte, and a novolak-type phenol resin (A) and a resol-type phenol resin (B) were added thereto. The solvent was isopropyl alcohol, ethylene glycol or diethylene glycol.

In the present inventive examples 11, 12 and 13, the total amount of phenol resin was 12%, the ratio $$\frac{(B)}{(A) + (B)} \times 100$$

being respectively 3, 7 and 25%, and the solvent was isopropyl alcohol. In every case, the tap hole mix was kneaded easily and could be filled in the tap hole smoothly. A sufficiently high bending strength of 30 to 40 kg/cm² could readily be obtained in the baking for 15 minutes at 600° C, and the holding of the plugging gun could be completed within 10 minutes, thus improving the operation efficiency enormously. A high bending strength of 25 to 35 kg/cm² was obtained at 1400° C and the corrosion resistance was also excellent. The tapping could be continued smoothly for 120 to 135 minutes with entirely no occurrence of black smoke and abnormal dusts.

The composition of the tap hole mix in comparison examples 14 and 15 were the same as in examples 11 – 13, except that the ratio $$\frac{(B)}{(A) + (B)} \times 100$$

was 2% and 50% respectively. Since $$\frac{(B)}{(A) + (B)} \times 100 = 2\%$$

in comparison example 14, this tap hole mix is inferior in its rapidly strengthened property and corrosion resistance, and the bending strength was also as low as 10 kg/cm² in the baking at 600° C for 15 minutes, so that, it was necessary to hold the plugging gun as long as 40 minutes and the tapping could be obtained only for 60 minutes. Thus, the operation efficiency was inferior. In comparison example 15, $$\frac{(B)}{(A) + (B)} \times 100 = 50\%,$$

so that the thermal stability of the mix was inferior, the mix was hardened completely in the plugging gun by the radiation heat of the tapping spout, and the plugging by using this mix was in failure.

In the present inventive examples 16 and 17 and comparison example 18, refractory materials of alumina, silicon carbide, clay, coke and chamotte was kneaded together with phenol resin and ethylene glycol under the condition that $$\frac{(B)}{(A) + (B)} \times 100 = 7\%$$

to obtain a tap hole mix. In example 16, the phenol resin in total was 3%, and 15% of ethylene glycol was added. The bending strength of the mix was sufficiently high as 25 kg/cm² at 600° C and 20 kg/cm² at 1400° C, and the mix was excellent in the rapid hardening property and corrosion resistance. The necessary holding time of the plugging gun was short enough as 15 minutes, and the tapping could smoothly be continued for 90 minutes. Example 17 contained 30% of phenol resin and 8% of ethylene glycol. During kneading, the mix became somewhat viscous and the kneader received some burden, but no special trouble occurred thereby and the plugging could also be done smoothly. After plugging, the mix was strengthened rapidly and it was enough to hold the plugging gun for 10 minutes. The bending strength at 1400° C was as high as 42 kg/cm², and the tapping could be contained smoothly for 130 minutes.

Comparison example 18 contained 35% in total of phenol resin and 10% of ethylene glycol. The kneadability was inferior and the mix adhered to the interior of the kneader, its roller and scrapper. A large amount of the decomposition gas evolved from the resin, and consequently the mix was difficultly bound. The porosity became as high as 39%, and the corrosion resistance was inferior. Abnormal dusts were caused to occur due to the decomposition of the resin, the tapping time was shortened to 40 minutes, and thus the mix was unsuitable for the blast furnace operation.

In the present invention example 19 and comparative examples 20 and 21, the refractory materials were the same as in examples 16, 17 and 18, and 12% in total of phenol resin and respectively 4, 3 and 20% of dimethylene glycol were added thereto. The result of practical test of the example 19 showed that the mix was excellent in its kneadability and plasticity. The bending strength was sufficiently high as 25 kg/cm² at 600° C and 22 kg/cm² at 1400° C. It was enough to hold the plugging gun for 10 minutes, and the stable tapping could be continued as long as 95 minutes. Since the amount of dimethylene glycol as a solvent was so little as 3%, comparison example 20 was rustling during kneading and had no sufficient plasticity. The plugging of the tap hole with this mix was in failure. Comparison example 21 contained a large amount of solvent, so that the mix was sticky and showed a poor bending strength of only 13 kg/cm² at 600° C and 7 kg/cm² at 1400° C. The plugging gun must be held for 30 minutes, and thus the operation efficiency was inferior. Since the solvent was too much, the porosity became very high as 40%, deteriorating the corrosion resistance, and abnormal dusts were caused to occur.

As an additional example of another characteristic of the present invention, the result of the practical test of a tap hole mix containing a novolak-type resin (A) and melamine resin (B) as a thermosetting resin under the condition that (A) + (B) = 19.5% and $$\frac{(B)}{(A) + (B)} \times 100 = 23.1\% \text{ and } 5\%$$

of ethylene glycol will be shown in Table 3. The result showed that the hot bending strength was quite high as 40 kg/cm² at 600° C and 35 kg/cm² at 1400° C. The mix was strengthened rapidly, the corrosion resistance was also improved to about two times and the tapping interval was shortened to one fourth. The tapping condition was also very stable.

Table 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Chamotte | 20 % | 20 % | 20 % | 20 % | 20 % | 20 % | 20 % | 20 % | 20 % | 20 % |
| Clay | 15 | 15 | 15 | 15 | 15 | 15 | 15 | 15 | 15 | 15 |
| Silicon carbide | 15 | 15 | 15 | 15 | 15 | 15 | 15 | 15 | 15 | 15 |
| Coke | 30 | 30 | 30 | 30 | 15 | 30 | 30 | 30 | 30 | 30 |
| Novolak-type Phenol resin |  |  |  | 15 | 30 | 15 | 15 | 15 | 15 | 15 |
| Lignine-modified phenol resin | 15 | 15 | 15 |  |  |  |  |  |  |  |
| Hexamethylene-tetramine |  |  |  | 0.5* | 0.5* | 2.5* | 5* |  |  |  |
| Paraformaldehyde | 0.5* | 5* | 10* |  |  |  |  |  |  |  |
| Acetal resin |  |  |  |  |  |  |  | 0.5* | 5* | 10* |
| Ethylene glycol | 5 | 5 | 5 | 5 | 5 | 5 | 5 | 5 | 5 | 5 |
| Hot bending strength at 600° C for 10 min. (kg/cm²) | 25 | 30 | 35 | 30 | 35 | 35 | 50 | 24 | 30 | 35 |
| Hot bending strength at 1400° C for 1 hr. (kg/cm²) | 18 | 24 | 27 | 20 | 25 | 27 | 40 | 20 | 22 | 26 |
| Apparent porosity |  |  |  |  |  |  |  |  |  |  |

Table 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| (baked at 1200° C,%) | 33 | 30 | 30 | 33 | 34 | 28 | 27 | 35 | 33 | 30 |
| Holding time of plugging gun (min.) | 15 | 10 | 7 | 15 | 15 | 7 | 5 | 20 | 15 | 10 |
| Tapping time/one tapping (min.) | 80 | 90 | 110 | 85 | 85 | 95 | 100 | 88 | 95 | 120 |
| Tapping amount/one tapping (ton) | 320 | 360 | 550 | 350 | 340 | 400 | 520 | 343 | 385 | 520 |
| Occurrence of abnormal dusts | no | no | no | no | no | no | no | no | no | no |

*per resin

Table 2

|  | Inventive | | | Comparison | | Inventive | | Comparison | Inventive | Comparison | |
|---|---|---|---|---|---|---|---|---|---|---|---|
|  | 11 | 12 | 13 | 14 | 15 | 16 | 17 | 18 | 19 | 20 | 21 |
| Alumina | 30 % | 30 % | 30 % | 30 % | 30 % | 30 % | 30 % | 30 % | 30 % | 30 % | 30 % |
| Silicon carbide | 20 | 20 | 20 | 20 | 20 | 20 | 20 | 20 | 20 | 20 | 20 |
| Clay | 15 | 15 | 15 | 15 | 15 | 10 | 10 | 10 | 10 | 10 | 10 |
| Coke | 15 | 15 | 15 | 15 | 15 | 15 | 15 | 15 | 15 | 15 | 15 |
| Chamotte | — | — | — | — | — | 5 | 5 | 5 | 5 | 5 | 5 |
| Phenol resin | 12 | 12 | 12 | 12 | 12 | 3 | 30 | 35 | 12 | 12 | 12 |
| Solvent | *1 IPA 8 | IPA 8 | IPA 8 | IPA 8 | IPA 8 | *2 EG 15 | EG 8 | EG 10 | *3 DEG 4 | DEG 3 | DEG 20 |
| $\frac{(B)}{(A)+(B)} \times 100$ | 3 | 7 | 25 | 2 | 50 | 7 | 7 | 7 | 7 | 7 | 7 |
| Hot bending strength at 600° C for 15 min. (kg/cm²) | 30 | 35 | 40 | 15 | 70 | 25 | 50 | 15 | 25 | 12 | 13 |
| Hot bending strength at 1400° C for 1 hr. (kg/cm²) | 25 | 30 | 35 | 10 | 50 | 20 | 42 | 50 | 22 | 8 | 7 |
| Apparent porosity (baked at 1200° C,%) | 28 | 26 | 24 | 37 | 25 | 32 | 30 | 39 | 29 | 38 | 40 |
| Extrusion force (kg/cm²) | 4 | 4.5 | 4.7 | 4 | 5 | 2 | 4 | 4 | 4.7 | 4.2 | 1.5 |
| Kneadability | good | good | good | good | good | good | good | bad | good | bad | bad |
| Tapping time/one tapping (min.) | 120 | 130 | 135 | 60 | plugging was impossible | 90 | 130 | 40 | 95 | plugging was impossible | 35 |
| Occurrence of dusts | no | no | no | no | — | no | no | yes | no | — | yes |

*1 IPA: Isopropyl alcohol
*2 EG: Ethylene glycol
*3 DEG: Diethylene glycol

Table 3

|  | Example 22 |
|---|---|
| Chamotte | 20 % |
| Clay | 15 |
| Silicon carbide | 15 |
| Coke | 30 |
| Novolak-type phenol resin | 15 |
| Melamine resin | 30 (per resin) |
| Ethylene glycol | 5 |
| Hot bending strength (kg/cm²) at 600° C for 10 min. | 40 |
| Hot bending strength (kg/cm²) at 1400° C for 1 hr. | 35 |
| Apparent porosity (%) (baked at 1200° C) | 32 |
| Holding time of plugging gun (min.) | 5 |
| Tapping time/one tapping (min.) | 130 |
| Tapping amount/one tapping (ton) | 550 |
| Occurrence of abnormal dusts | no |

What is claimed is:

1. In a tap hole mix for a blast furnace composed of refractory materials and a binder, the improvement which comprises said binder consisting essentially of a novolak phenol resin (A) having a mean molecular weight from 200 to 800, a substance which produces formaldehyde by thermal decomposition when subjected to the furnace heat and an alcoholic solvent, the amount of resin being from 3 to 30 percent based on the total mix, the amount of solvent being from 4 to 15 percent based on the total mix, the amount of formaldehyde producing substance being from 0.5 to 10 percent based on the resin and the remainder of the mix being refractory material.

2. The mix of claim 1 wherein the formaldehyde producing substance is an acetal resin.

3. The mix of claim 1 wherein the formaldehyde producing substance is hexamethylene tetramine in an amount from 0.5 to 5 percent.

4. The mix of claim 1 wherein the alcoholic solvent is selected from the group consisting of methanol, ethanol, isopropyl alcohol, ethylene glycol, diethylene glycol, liquid polyethylene glycol, propylene glycol, glycerine and benzyl alcohol.

5. In a tap hole mix for a blast furnace composed of refractory materials and a binder, the improvement which comprises said binder consisting essentially of a novolak phenol resin (A) having a mean molecular weight from 200 to 800, a substance which produces formaldehyde by thermal decomposition when subjected to the furnace heat and an alcoholic solvent, the amount of resin being from 3 to 30 percent based on the total mix, the amount of solvent being from 4 to 15 percent based on the total mix, the amount of formaldehyde producing substance being from 0.5 to 10 percent based on the resin, a thermosetting resin (B), the amount of resins (A) and (B) satisfying the relationships:

$$A) + (B) = 3 \text{ to } 30\% \text{ and } \frac{(B)}{(A)+(B)} \times 100 = 3 \text{ to } 25\%,$$

and the remainder of the mix being refractory material.

6. The mix of claim 5 wherein the thermosetting resin (B) is selected from the group consisting of resol-type phenol resin, melamine resin, urea resin, analine resin and epoxy resin.

7. The mix of claim 5 wherein the alcoholic solvent is selected from the group consisting of methanol, ethanol, ispropyl alcohol, ethylene glycol, diethylene glycol, liquid polyethylene glycol, propylene glycol, glycerine and benzyl alcohol.

* * * * *